(12) United States Patent
Lin et al.

(10) Patent No.: US 11,914,277 B2
(45) Date of Patent: Feb. 27, 2024

(54) ILLUMINATION SYSTEM AND PROJECTION DEVICE

(71) Applicant: Coretronic Corporation, Hsin-Chu (TW)

(72) Inventors: Hung-Yu Lin, Hsin-chu (TW); Chi-Fu Liu, Hsin-chu (TW); Chun-Hsin Lu, Hsinchu (TW); Chun-Li Chen, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 138 days.

(21) Appl. No.: 17/577,374

(22) Filed: Jan. 18, 2022

(65) Prior Publication Data

US 2022/0252967 A1 Aug. 11, 2022

(30) Foreign Application Priority Data

Feb. 9, 2021 (CN) .......................... 202120360811.8

(51) Int. Cl.
*G03B 21/20* (2006.01)
(52) U.S. Cl.
CPC ....... *G03B 21/204* (2013.01); *G03B 21/2013* (2013.01)
(58) Field of Classification Search
CPC .......................... G03B 21/204; G03B 21/2013
USPC .......................................................... 353/31
See application file for complete search history.

(56) References Cited

U.S. PATENT DOCUMENTS

2021/0191138 A1* 6/2021 Zhai ..................... G02B 27/149

FOREIGN PATENT DOCUMENTS

| CN | 207352345 U | * | 5/2018 |
| CN | 106523955 | | 10/2019 |
| CN | 209962078 U | * | 1/2020 |
| CN | 214375786 U | * | 10/2021 |
| TW | 200842478 | | 11/2008 |

OTHER PUBLICATIONS

Translation: CN209962078 (Year: 2023).*
Translation: CN 214375786 (Year: 2023).*
Translation: CN 207352345 (Year: 2023).*

* cited by examiner

*Primary Examiner* — Jerry L Brooks
(74) *Attorney, Agent, or Firm* — JCIPRNET

(57) ABSTRACT

An illumination system for providing an illumination beam includes red, blue, and green light source modules, a first light combining element, and a light uniforming element. The red light source module includes a first red light emitting element emitting first red light and a second red light emitting element emitting second red light. A peak wavelength of the second red light is greater than a peak wavelength of the first red light. The blue light source module includes a first blue light emitting element emitting first blue light and a second blue light emitting element emitting second blue light. A peak wavelength of the second blue light is less than a peak wavelength of the first blue light. The green light source module generates green light. The first light combining element guides these lights into the light uniforming element, so that the illumination system outputs the illumination beam.

16 Claims, 3 Drawing Sheets

ILLUMINATION SYSTEM AND PROJECTION DEVICE

CROSS-REFERENCE TO RELATED APPLICATION

This application claims the priority benefit of China application serial no. 202120360811.8, filed on Feb. 9, 2021. The entirety of the above-mentioned patent application is hereby incorporated by reference herein and made a part of this specification.

BACKGROUND

Technical Field

The disclosure relates to an optical system and an optical device, in particular, to an illumination system and a projection device.

Description of Related Art

In the current architecture of an RGB light emitting diode or laser diode projection device, an independent light source with three optical paths RGB is often used as the main architecture in the light combining system. In addition, for requirements of high brightness, an additional short-wavelength blue exciting light source may be added to excite and generate a green light. As a result, the overall output brightness is increased. In the pursuit of improvement of the overall brightness, compared with color balance, the improvement of color brightness also needs to be further considered and enhanced.

However, using a blue exciting light source to excite a green light to increase the brightness may raise the proportion of overall green color energy and thus cause the screen to be greenish. In addition, in order to balance the colors, red light and blue light currents may be increased, and it causes the temperature to increase, and red light is more sensitive to heat, which results in saturation and lowers overall conversion efficiency.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an illumination system, which may increase a brightness ratio of a red light and a blue light under the condition of reducing current values of red light and blue light sources. Therefore, the illumination system may reduce thermal energy and provide balanced energy of red light, green light, and blue light. Moreover, a projection device using the illumination system in the embodiment of the disclosure may thus provide a projection image with stable and favorable display effect.

According to an embodiment of the disclosure, an illumination system is configured to provide an illumination beam. The illumination system includes a red light source module, a blue light source module, a green light source module, a first light combining element, and a light uniforming element. The red light source module includes a first red light emitting element and a second red light emitting element. The first red light emitting element is configured to emit a first red light. The second red light emitting element is configured to emit a second red light. A peak wavelength of the second red light is greater than a peak wavelength of the first red light. The blue light source module includes a first blue light emitting element and a second blue light emitting element. The first blue light emitting element is configured to emit a first blue light. The second blue light emitting element is configured to emit a second blue light. A peak wavelength of the second blue light is less than a peak wavelength of the first blue light. The green light source module is configured to generate a green light. The first light combining element guides the first red light, the second red light, the first blue light, the second blue light, and the green light into the light uniforming element, so that the illumination system outputs the illumination beam.

According to an embodiment of the disclosure, a projection device includes an illumination system, at least one light valve, and a projection lens. The illumination system is configured to provide an illumination beam. The light valve is disposed on a transmission path of the illumination beam to convert the illumination beam into an image beam. The projection lens is disposed on a transmission path of the image beam to project the image beam out of the projection device. The illumination system includes a red light source module, a blue light source module, a green light source module, a first light combining element, and a light uniforming element. The red light source module includes a first red light emitting element and a second red light emitting element. The first red light emitting element is configured to emit a first red light. The second red light emitting element is configured to emit a second red light. A peak wavelength of the second red light is greater than a peak wavelength of the first red light. The blue light source module includes a first blue light emitting element and a second blue light emitting element. The first blue light emitting element is configured to emit a first blue light. The second blue light emitting element is configured to emit a second blue light. A peak wavelength of the second blue light is less than a peak wavelength of the first blue light. The green light source module is configured to generate a green light. The first light combining element guides the first red light, the second red light, the first blue light, the second blue light, and the green light into the light uniforming element, so that the illumination system outputs the illumination beam.

According to an embodiment of the disclosure, an illumination system is configured to provide an illumination beam. The illumination system includes a red light source module, a blue light source module, a green light source module, a first light combining element, and a light uniforming element. The red light source module includes a first red light emitting element and a second red light emitting element. The first red light emitting element is configured to emit a first red light. The second red light emitting element is configured to emit a second red light. A peak wavelength of the second red light is greater than a peak wavelength of the first red light. The blue light source module is configured to generate a blue light. The green light source module is configured to generate a green light. The first light combining element guides the first red light, the second red light, the blue light, and the green light into the light uniforming element, so that the illumination system outputs the illumination beam.

According to an embodiment of the disclosure, an illumination system is configured to provide an illumination beam. The illumination system includes a red light source module, a blue light source module, a green light source module, a first light combining element, and a light uniforming element. The red light source module is configured to generate a red light. The blue light source module includes a first blue light emitting element and a second blue light emitting element. The first blue light emitting element is configured to emit a first blue light. The second blue light emitting element is configured to emit a second blue light. A peak wavelength of the second blue light is less than a peak wavelength of the first blue light. The green light source module is configured to generate a green light. The first light combining element guides the red light, the first blue light, the second blue light, and the green light into the light uniforming element, so that the illumination system outputs the illumination beam.

Based on the above, in an embodiment of the disclosure, the red light source module includes the first red light emitting element and the second red light emitting element, and the blue light source module includes the first blue light emitting element and the second blue light emitting element. Therefore, input currents required by each of the red light emitting elements and each of the blue light emitting elements may be reduced, so that the system temperature of the projection device or the illumination system is relatively low, thereby reducing thermal saturation of the system and improving the energy conversion efficiency of the system. Moreover, when the green light source module is used together to generate the green light, the energy proportion of the red light, the green light, and the blue light is more balanced. Therefore, the color rendering effect of the projection device or the illumination system is improved.

In addition, in another embodiment of the disclosure, the red light source module includes the first red light emitting element and the second red light emitting element, or the blue light source module includes the first blue light emitting element and the second blue light emitting element. Therefore, input currents required by each of the red light emitting elements or each of the blue light emitting elements may be reduced, so that the system temperature of the illumination system is relatively low, thereby reducing thermal saturation of the system and improving the energy conversion efficiency of the system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
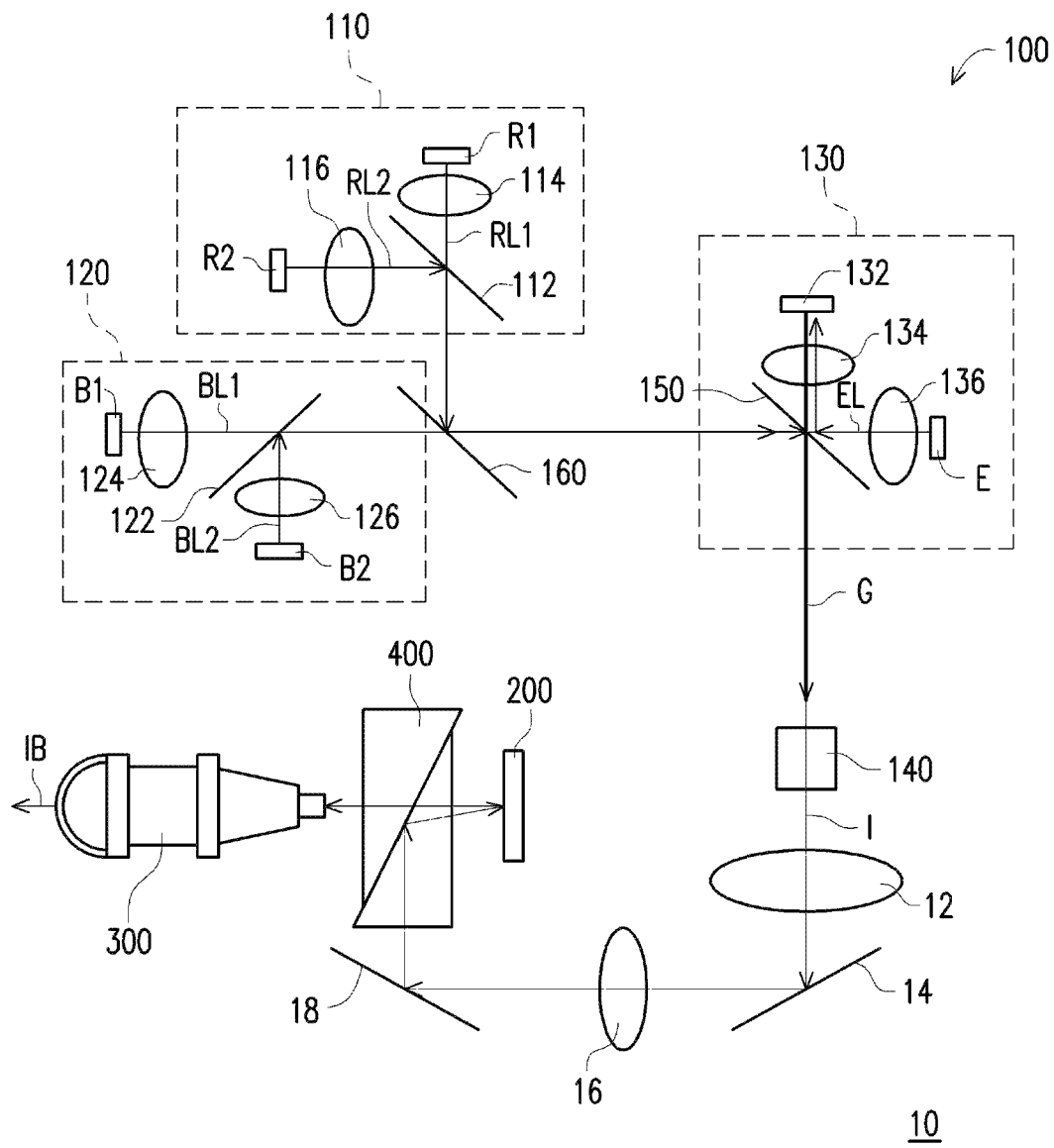
FIG. 1 is a schematic view of an illumination system and a projection device according to a first embodiment of the disclosure.

FIG. 1 is a schematic view of an illumination system and a projection device according to a first embodiment of the disclosure. Referring to FIG. 1, in an embodiment of the disclosure, a projection device 10 includes an illumination system 100, at least one light valve 200, and a projection lens 300. The illumination system 100 is configured to provide an illumination beam I. The light valve 200 is disposed on a transmission path of the illumination beam I to convert the illumination beam I into an image beam IB. The projection lens 300 is disposed on a transmission path of the image beam IB to project the image beam IB from the light valve 200 out of the projection device 10.

In this embodiment, the illumination system 100 includes a red light source module 110, a blue light source module 120, a green light source module 130, a first light combining element 150, and a light uniforming element 140. The red light source module 110 includes a first red light emitting element R1 and a second red light emitting element R2. The first red light emitting element R1 and the second red light emitting element R2 may be light emitting diode (LED) elements or laser diode (LD) elements, and may be a single light emitting element or a light emitting element array. The first red light emitting element R1 is configured to emit a first red light RL1, and the second red light emitting element R2 is configured to emit a second red light RL2.

In this embodiment, a peak wavelength of the second red light RL2 is greater than a peak wavelength of the first red light RL1. In an exemplary embodiment, a wavelength of the first red light RL1 falls within a range of 600 nm to 630 nm, and a wavelength of the second red light RL2 falls within a range of 645 nm to 675 nm. The red lights with two different wavelengths help reduce an input current required by each of the red light emitting elements, so that the system temperature of the projection device 10 or the illumination system 100 is relatively low. Therefore, thermal saturation of the system is reduced, so that the energy conversion efficiency of the system is improved. Moreover, the wavelength ranges of the first red light RL1 and the second red light RL2 cover 600 nm to 675 nm, which is approximately a red light range of visible light. Therefore, the red light that the projection device 10 or the illumination system 100 may output has a relatively wide color gamut. In addition, the second red light emitting element R2 with the long-wavelength red light also helps the projection device 10 or the illumination system 100 output the red light with higher brightness.

In this embodiment, the red light source module 110 further includes a light splitting element 112, a lens set 114, and a lens set 116. The light splitting element 112 is disposed on transmission paths of the first red light RL1 and the second red light RL2, and allows the first red light RL1 to pass through and the second red light RL2 to reflect. However, the disclosure is not limited thereto. In an embodiment, positions where the first red light emitting element R1 and the second red light emitting element R2 are disposed may be reversed, and the light splitting element 112 allows the second red light RL2 to pass through and the first red light RL1 to reflect. In this embodiment, the lens set 114 is disposed between the first red light emitting element R1 and the light splitting element 112, and the lens set 116 is disposed between the second red light emitting element R2 and the light splitting element 112. The lens set 114 and the lens set 116 are configured to collimate the first red light RL1 and the second red light RL2, respectively.

In this embodiment, the blue light source module 120 includes a first blue light emitting element B1 and a second blue light emitting element B2. The first blue light emitting element B1 and the second blue light emitting element B2 may be light emitting diode elements or laser diode elements, and may be a single light emitting element or a light emitting element array. The first blue light emitting element B1 is configured to emit a first blue light BL1. The second blue light emitting element B2 is configured to emit a second blue light BL2.

In this embodiment, a peak wavelength of the second blue light BL2 is less than a peak wavelength of the first blue light BL1. In an exemplary embodiment, a wavelength of the first blue light BL1 falls within a range of 440 nm to 470 nm, and a wavelength of the second blue light BL2 falls within a range of 405 nm to 435 nm. The blue lights with two different wavelengths help reduce an input current required by each of the blue light emitting elements, so that the system temperature of the projection device 10 or the illumination system 100 is relatively low. Therefore, the thermal saturation of the system is reduced, so that the energy conversion efficiency of the system is improved. Moreover, the wavelength ranges of the first blue light BL1 and the second blue light BL2 cover 405 nm to 470 nm, which is approximately a blue light range of visible light. Therefore, the blue light that the projection device 10 or the illumination system 100 may output has a relatively wide color gamut. In addition, the second blue light emitting element B2 with the short-wavelength blue light also helps the projection device 10 or the illumination system 100 output the blue light with higher brightness.

In this embodiment, the blue light source module 120 further includes a light splitting element 122, a lens set 124, and a lens set 126. The light splitting element 122 is disposed on transmission paths of the first blue light BL1 and the second blue light BL2, and allows the first blue light BL1 to pass through and the second blue light BL2 to reflect. However, the disclosure is not limited thereto. In an embodiment, positions where the first blue light emitting element B1 and the second blue light emitting element B2 are disposed may be reversed, and the light splitting element 122 allows the second blue light BL2 to pass through and the first blue light BL1 to reflect. In this embodiment, the lens set 124 is disposed between the first blue light emitting element B1 and the light splitting element 122, and the lens set 126 is disposed between the second blue light emitting element B2 and the light splitting element 122. The lens set 124 and the lens set 126 are configured to collimate the first blue light BL1 and the second blue light BL2, respectively.

In this embodiment, the green light source module 130 is configured to generate a green light G. The green light source module 130 includes an exciting light source element E and a wavelength conversion element 132. The exciting light source element E is configured to emit an exciting light EL. The exciting light source element E may be a blue light emitting diode element, a blue laser diode element, or a blue pumping laser light source, and may be a single light emitting element or a light emitting element array. In the embodiment, the wavelength conversion element 132 may be a phosphor wheel.

In this embodiment, the first light combining element 150 reflects the exciting light EL from the exciting light source element E to the wavelength conversion element 132. After the exciting light EL is transmitted to the wavelength conversion element 132, the exciting light EL is converted into the green light G by the wavelength conversion element 132. Next, the green light G passes through the first light combining element 150, and then is transmitted to the light uniforming element 140. In an embodiment of the disclosure, the exciting light source element E and the wavelength conversion element 132 are used to generate the green light G, so that the projection device 10 or the illumination system 100 may output the green light with higher brightness. Moreover, the red light source module 110 is used together to generate the first red light RL1 and the second red light RL2, and the blue light source module 120 is used to generate the first blue light BL1 and the second blue light BL2, which also allows the proportion of red, green, and blue light energy to be more balanced. Therefore, the color rendering effect of the projection device 10 or the illumination system 100 is improved.

In this embodiment, the green light source module 130 further includes a lens set 134 and a lens set 136. The lens set 134 is disposed between the wavelength conversion element 132 and the first light combining element 150, and the lens set 136 is disposed between the exciting light source element E and the first light combining element 150. The lens set 136 is configured to collimate the exciting light EL. The lens set 134 is configured to converge the exciting light EL to be transmitted to the wavelength conversion element 132, and collimate or converge the green light G to be transmitted to the light uniforming element 140.

In this embodiment, the first light combining element 150 further reflects the first red light RL1, the second red light RL2, the first blue light BL1, and the second blue light BL2 to the light uniforming element 140. The first light combining element 150 guides the first red light RL1, the second red light RL2, the first blue light BL1, the second blue light BL2, and the green light G into the light uniforming element 140, so that the illumination system 100 outputs the illumination beam I.

In this embodiment, the illumination system 100 further includes a second light combining element 160. The second light combining element 160 is configured to combine the first red light RL1, the second red light RL2, the first blue light BL1, and the second blue light BL2 into the same optical path to be transmitted to the first light combining element 150. Taking FIG. 1 as an example, the second light combining element 160 reflects the first red light RL1 and the second red light RL2 from the red light source module 110 to be transmitted to the first light combining element 150, and allows the first blue light BL1 and the second blue light BL2 from the blue light source module 120 to pass through to the first light combining element 150. However, the disclosure is not limited thereto. In an embodiment, positions where the red light source module 110 and the blue light source module 120 are disposed may be reversed. The second light combining element 160 allows the first red light RL1 and the second red light RL2 to pass through to be transmitted to the first light combining element 150, and reflects the first blue light BL1 and the second blue light BL2 to the first light combining element 150.

In this embodiment, the light uniforming element 140 uniforms the passing first red light RL1, second red light RL2, green light G, first blue light BL1, and second blue light BL2. The light uniforming element 140 is, for example, an integration rod, a lens array, or other optical elements with light uniforming effect, but the disclosure is not limited thereto.

In this embodiment, the light valve 200 is a spatial light modulator, such as a digital micro-mirror device (DMD), a liquid-crystal-on-silicon panel (LCOS panel), and a liquid crystal panel (LCD). In addition, the projection lens 300 includes, for example, one or a combination of multiple optical lenses with diopter values. The optical lens includes, for example, various combinations of non-planar lenses including biconcave lenses, biconvex lenses, concave-convex lenses, convex-concave lenses, plane-convex lenses, plane-concave lenses, etc. The disclosure does not limit the form and type of the projection lens 300.

In this embodiment, the projection device 10 further includes a reflection element 14 and a reflection element 18. The reflection element 14 is configured to reflect the illumination beam I from the light uniforming element 140 to the reflection element 18, and the reflection element 18 reflects the illumination beam I to be transmitted to the light valve 200. The reflection element 14 and the reflection element 18 may be total reflection mirrors or white reflection sheets. When the reflection element 14 or the reflection element 18 is a total reflection mirror, the light energy utilization efficiency of the projection device 10 is improved. When the reflection element 14 or the reflection element 18 is a white reflection sheet, since the white reflection sheet is the reflection sheet with diffusion effect, the uniformity of the illumination beam I is improved.

In this embodiment, the projection device 10 further includes a lens set 12 and a lens set 16. The lens set 12 is disposed between the light uniforming element 140 and the reflection element 14, and the lens set 16 is disposed between the reflection element 14 and the reflection element 18. The lens set 12 and the lens set 16 are configured to collimate or converge the illumination beam I to be transmitted to the light valve 200.

In this embodiment, the projection device 10 further includes a prism set 400. The prism set 400 may be a total internal reflection prism (TIR prism) formed by combining two prisms. The illumination beam I reflected by the reflection element 18 is transmitted to the prism set 400, and then is reflected by the prism set 400 to the light valve 200. After the illumination beam I is converted into the image beam IB by the light valve 200, the image beam IB passes through the prism set 400 to be transmitted to the projection lens 300.

Figure 2:
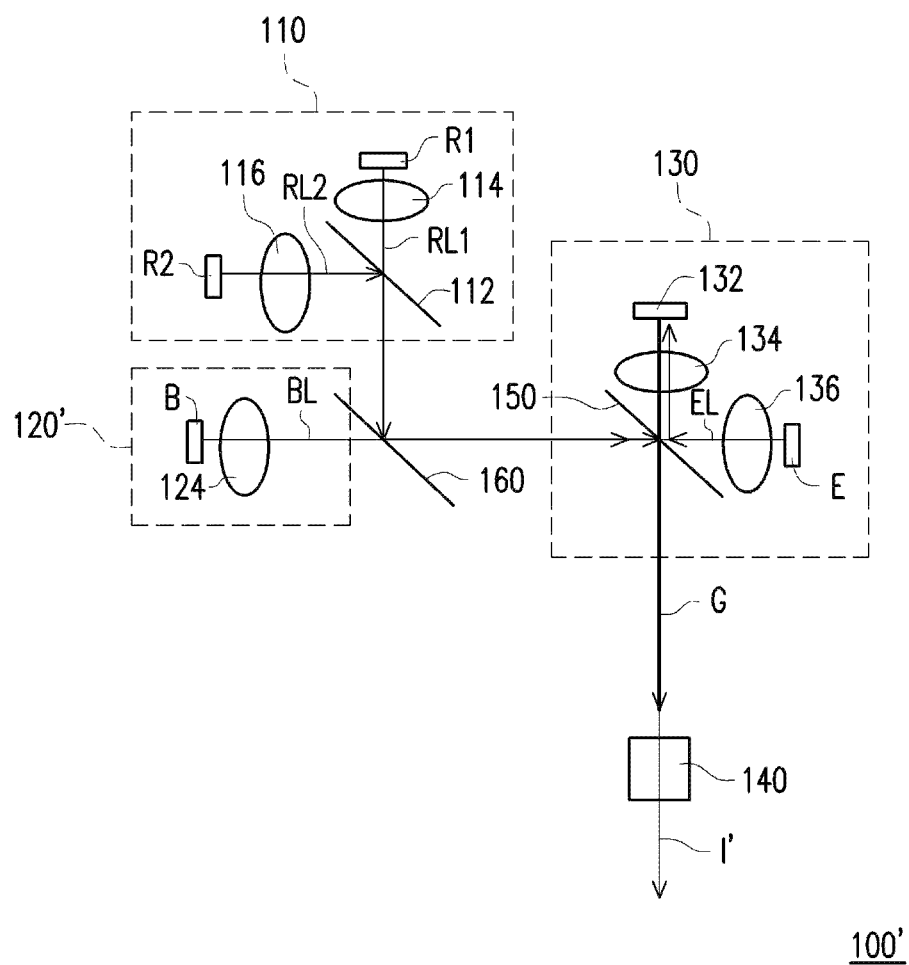
FIG. 2 is a schematic view of an illumination system according to a second embodiment of the disclosure.

FIG. 2 is a schematic view of an illumination system according to a second embodiment of the disclosure. Referring to FIG. 2, an illumination system 100' of FIG. 2 is similar to the illumination system 100 of FIG. 1, and the main difference is that a blue light source module 120' is configured to generate a blue light BL. In this embodiment, the blue light source module 120' includes a blue light emitting element B. The red light source module 110 and the green light source module 130 of the illumination system 100' are substantially similar to the red light source module 110 and the green light source module 130 of the illumination system 100 in FIG. 1, and the same details will not be repeated in the following. In addition, the first light combining element 150 guides the first red light RL1, the second red light RL2, the blue light BL, and the green light G into the light uniforming element 140, so that the illumination system 100' outputs an illumination beam I'.

In this embodiment, the blue light emitting element B of the illumination system 100' may be the first blue light emitting element B1 or the second blue light emitting element B2 of the blue light source module 120 in the illumination system 100. A wavelength of the blue light BL in the illumination system 100' may be the same as the wavelength of the first blue light BL1 or the wavelength of the second blue light BL2 in the illumination system 100, but the wavelength of the blue light BL is preferably the same as the wavelength of the first blue light BL1. That is to say, the wavelength of the blue light BL preferably falls within the range of 440 nm to 470 nm.

Figure 3:
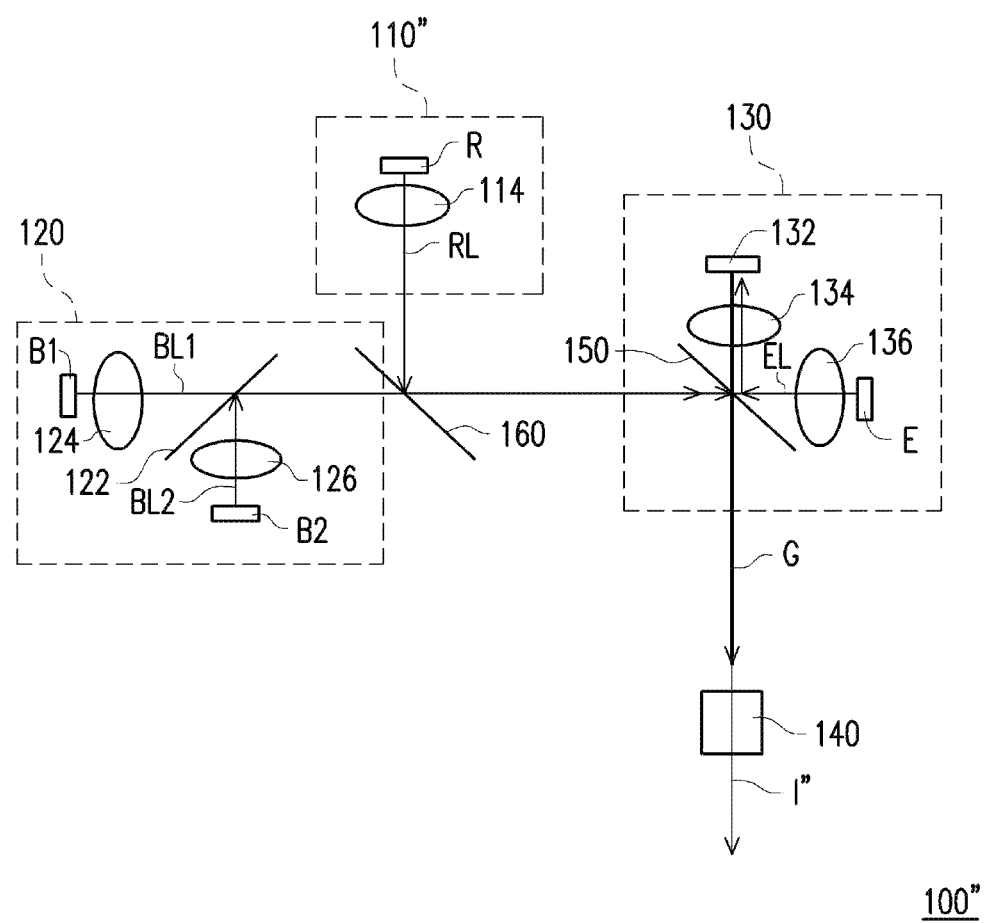
FIG. 3 is a schematic view of an illumination system according to a third embodiment of the disclosure.

FIG. 3 is a schematic view of an illumination system according to a third embodiment of the disclosure. Referring to FIG. 3, an illumination system 100" of FIG. 3 is similar to the illumination system 100 of FIG. 1, and the main difference is that a red light source module 110" is configured to generate a red light RL. In this embodiment, the red light source module 110" includes a red light emitting element R. The blue light source module 120 and the green light source module 130 of the illumination system 100" are substantially similar to the blue light source module 120 and the green light source module 130 of the illumination system 100 in FIG. 1, and the same details will not be repeated in the following. In addition, the first light combining element 150 guides the red light RL, the first blue light BL1, the second blue light BL2, and the green light G into the light uniforming element 140, so that the illumination system 100" outputs an illumination beam I".

In this embodiment, the red light emitting element R of the illumination system 100" may be the first red light emitting element R1 or the second red light emitting element R2 of the illumination system 100. A wavelength of the red light RL of the illumination system 100" may be the same as the wavelength of the first red light RL1 or the wavelength of the second red light RL2 in the illumination system 100, but the wavelength of the red light RL is preferably the same as the wavelength of the first red light RL1. That is to say, the wavelength of the red light RL preferably falls within the range of 600 nm to 630 nm.

Based on the above, in the first embodiment of the disclosure, the red light source module may emit the first red light and the second red light of different wavelengths, and the blue light source module may emit the first blue light and the second blue light of different wavelengths. Therefore, input currents required by each of the red light emitting elements and each of the blue light emitting elements may be reduced, so that the system temperature of the projection device or the illumination system is relatively low, thereby reducing the thermal saturation of the system and improving the energy conversion efficiency of the system. When the green light source module is used together to generate the green light, the energy proportion of the red light, the green light, and the blue light is more balanced. Therefore, the color rendering effect of the projection device or the illumination system is improved. Since the projection device or illumination system uses the first red light, the second red light, the first blue light, and the second blue light, the overall brightness of the projection device or illumination system may be increased, and the brightness of each color on the screen may also be increased.

In addition, in the second embodiment or the third embodiment of the disclosure, the red light source module may emit the first red light and the second red light of different wavelengths, or the blue light source module may emit the first blue light and the second blue light of different wavelengths. Therefore, the input current required by each of the red light emitting elements or each of the blue light emitting elements may be reduced, so that the system temperature of the illumination system is relatively low, thereby reducing the thermal saturation of the system and improving the energy conversion efficiency of the system. When the green light source module is used together to generate the green light, the energy proportion of the red light, green light, and blue light is more balanced. Therefore, the color rendering effect of the illumination system is improved. Since the illumination system uses the first red light and the second red light or first blue light and the second blue light, the overall brightness of the projection device or illumination system may be increased, and the brightness of each color on the screen may also be increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system configured to provide an illumination beam, comprising a red light source module, a blue light source module, a green light source module, a first light combining element, a light splitting element, and a light uniforming element, wherein:
   the red light source module comprises a first red light emitting element and a second red light emitting element, the first red light emitting element is configured to emit a first red light, and the second red light emitting element is configured to emit a second red light, wherein a peak wavelength of the second red light is greater than a peak wavelength of the first red light;
   the blue light source module comprises a first blue light emitting element and a second blue light emitting element, the first blue light emitting element is configured to emit a first blue light, and the second blue light emitting element is configured to emit a second blue light, wherein a peak wavelength of the second blue light is less than a peak wavelength of the first blue light, and the light splitting element is configured to allow one of the first blue light and the second blue light to pass through, to reflect the other of the first blue light and the second blue light, and to guide both the first blue light and the second blue light to the first light combining element;
   the green light source module is configured to generate a green light; and
   the first light combining element guides the first red light, the second red light, the first blue light, the second blue light, and the green light into the light uniforming element, enabling the illumination system to output the illumination beam.

2. The illumination system according to claim 1, wherein a wavelength of the first red light falls within a range of 600 nm to 630 nm, and a wavelength of the second red light falls within a range of 645 nm to 675 nm.

3. The illumination system according to claim 1, wherein a wavelength of the first blue light falls within a range of 440 nm to 470 nm, and a wavelength of the second blue light falls within a range of 405 nm to 435 nm.

4. The illumination system according to claim 1, wherein the green light source module comprises an exciting light source element and a wavelength conversion element, the exciting light source element is configured to emit an exciting light, and after the exciting light is transmitted to the wavelength conversion element, the exciting light is converted into the green light by the wavelength conversion element.

5. The illumination system according to claim 4, wherein the first light combining element reflects the exciting light from the exciting light source element to the wavelength conversion element, and reflects the first red light, the second red light, the first blue light, and the second blue light to the light uniforming element, and the green light passes through the first light combining element and then is transmitted to the light uniforming element.

6. The illumination system according to claim 5, further comprising a second light combining element, wherein the second light combining element is configured to combine the first red light, the second red light, the first blue light, and the second blue light into a same optical path to be transmitted to the first light combining element.

7. A projection device, comprising an illumination system, at least one light valve, and a projection lens, wherein the illumination system is configured to provide an illumination beam, the at least one light valve is disposed on a transmission path of the illumination beam to convert the illumination beam into an image beam, and the projection lens is disposed on a transmission path of the image beam to project the image beam out of the projection device, wherein the illumination system comprises a red light source module, a blue light source module, a green light source module, a light splitting element, a first light combining element and a light uniforming element, wherein:

the red light source module comprises a first red light emitting element and a second red light emitting element, the first red light emitting element is configured to emit a first red light, and the second red light emitting element is configured to emit a second red light, wherein a peak wavelength of the second red light is greater than a peak wavelength of the first red light;

the blue light source module comprises a first blue light emitting element and a second blue light emitting element, the first blue light emitting element is configured to emit a first blue light, and the second blue light emitting element is configured to emit a second blue light, wherein a peak wavelength of the second blue light is less than a peak wavelength of the first blue light, and the light splitting element is configured to allow one of the first blue light and the second blue light to pass through, to reflect the other of the first blue light and the second blue light, and to guide both the first blue light and the second blue light to the first light combining element;

the green light source module is configured to generate a green light; and the first light combining element guides the first red light, the second red light, the first blue light, the second blue light, and the green light into the light uniforming element, enabling the illumination system to output the illumination beam.

8. The projection device according to claim 7, wherein a wavelength of the first red light falls within a range of 600 nm to 630 nm, and a wavelength of the second red light falls within a range of 645 nm to 675 nm.

9. The projection device according to claim 7, wherein a wavelength of the first blue light falls within a range of 440 nm to 470 nm, and a wavelength of the second blue light falls within a range of 405 nm to 435 nm.

10. The projection device according to claim 7, wherein the green light source module comprises an exciting light source element and a wavelength conversion element, the exciting light source element is configured to emit an exciting light, and after the exciting light is transmitted to the wavelength conversion element, the exciting light is converted into the green light by the wavelength conversion element.

11. The projection device according to claim 10, wherein the first light combining element reflects the exciting light from the exciting light source element to the wavelength conversion element, and reflects the first red light, the second red light, the first blue light, and the second blue light to the light uniforming element, and the green light passes through the first light combining element and then is transmitted to the light uniforming element.

12. The projection device according to claim 11, wherein the illumination system further comprises a second light combining element, and the second light combining element is configured to combine the first red light, the second red light, the first blue light, and the second blue light into a same optical path to be transmitted to the first light combining element.

13. An illumination system configured to provide an illumination beam, comprising a red light source module, a blue light source module, a green light source module, a light splitting element, a first light combining element and a light uniforming element, wherein:

the red light source module is configured to generate a red light;

the blue light source module comprises a first blue light emitting element and a second blue light emitting element, the first blue light emitting element is configured to emit a first blue light, and the second blue light emitting element is configured to emit a second blue light, wherein a peak wavelength of the second blue light is less than a peak wavelength of the first blue light, and the light splitting element is configured to allow one of the first blue light and the second blue light to pass through, to reflect the other of the first blue light and the second blue light, and to guide both the first blue light and the second blue light to the first light combining element;

the green light source module is configured to generate a green light; and the first light combining element guides the red light, the first blue light, the second blue light, and the green light into the light uniforming element, enabling the illumination system to output the illumination beam.

14. The illumination system according to claim 13, wherein a wavelength of the red light falls within a range of 600 nm to 630 nm.

15. The illumination system according to claim 13, wherein a wavelength of the first blue light falls within a range of 440 nm to 470 nm, and a wavelength of the second blue light falls within a range of 405 nm to 435 nm.

16. The illumination system according to claim 13, wherein the green light source module comprises an exciting light source element and a wavelength conversion element, the exciting light source element is configured to emit an exciting light, and after the exciting light is transmitted to the wavelength conversion element, the exciting light is converted into the green light by the wavelength conversion element.

\* \* \* \* \*